Patented Mar. 21, 1933

1,902,415

UNITED STATES PATENT OFFICE

KARL J. MONRAD, OF LITTLE FALLS, NEW YORK

SWEETENED AND FLAVORED DESSERT MADE WITH RENNIN

No Drawing.   Application filed July 21, 1931.   Serial No. 552,293.

This invention relates to sweetened and flavored desserts made with rennin and has for its object the improvement of the dry composition of matter which is to be added to the milk so that the powder can be added to the milk at higher temperatures than now permitted and also to improve the powder so as to avoid the scum which forms when, thru carelessness or otherwise, the mixture is allowed to lie on the bottom of the saucepan in the milk for a few seconds before stirring.

Previous powders for this general purpose have included a dry rennet preparation mixed with approximately 200 parts of sugar, the latter serving to dilute the rennet powder so that the rennin will act smoothly and evenly on the milk and will coagulate the milk in a very even manner.

To this mixture of sugar and rennin it seems quite necessary to add to the powder a calcium salt because the milk or cream usually obtainable in large cities has been pasteurized or sterilized in some one of the many methods, all of which serve to take away from the milk its well known property of curdling quickly under the action of the rennin. The calcium salt is therefore added to neutralize the effect of the pasteurization insofar as curdling is concerned and to restore to the milk or cream its property of giving a firm curd in a short period of time.

Heretofore the calcium salt used has been the hypophosphite but if the dessert should by any chance be made at a temperature of 125°–135° F., or greater, there will be formed, particularly with the highly colored flavors such as raspberry, a bad scum on the surface and this scum is much worse if the housewife should inadvertently allow the sweetened preparation to lie upon the bottom of the saucepan in the milk for a few seconds or more before stirring. I find that I can minimize the formation of this scum, and in fact substantially eliminate it, by using calcium glycerophosphate instead of the hypophosphite, the former giving as firm a curd with pasteurized milk as does the latter so that nothing is sacrificed by the change in the calcium salt.

With such flavors as chocolate or caramel it is not necessary to use a gelatinous substance to bind the flavoring matter but when the flavor is vanilla, orange, lemon, raspberry, coffee, etc., it is very well to add a material such as gum tragacanth, gum arabic or gelatin to bind the volatile oil of the flavoring ingredient to prevent the flavor from losing its strength by evaporation.

What I claim is:

1. A dry composition of matter for mixing with milk to form a sweetened and flavored dessert comprising sugar, rennin, a flavoring ingredient, and calcium glycerophosphate.

2. A dry composition of matter for mixing with milk to form a sweetened and flavored dessert comprising sugar, rennin, a flavoring ingredient, a gelatinous substance, and calcium glycerophosphate.

3. A dry mixture for dissolving in milk to form a sweetened and flavored dessert comprising about 200 parts of sugar, 1 to 4 parts flavoring ingredient, 1 part rennin and 3 to 10 parts calcium glycerophosphate.

4. A dry mixture for dissolving in pasteurized milk at a temperature above 110° F. to form a scumless milk dessert comprising about 95 percent sugar and the balance rennin, a flavoring ingredient, a gelatinous substance and calcium glycerophosphate.

In testimony whereof I affix my signature.

KARL J. MONRAD.